(12) United States Patent
Takaichi et al.

(10) Patent No.: US 11,951,392 B2
(45) Date of Patent: *Apr. 9, 2024

(54) INFORMATION PROCESSING APPARATUS AND INPUTTING APPARATUS FOR SHARING IMAGE DATA

(71) Applicant: Sony Interactive Entertainment Inc., Tokyo (JP)

(72) Inventors: Tomoki Takaichi, Tokyo (JP); Kiyobumi Matsunaga, Tokyo (JP); Toshimasa Aoki, Kanagawa (JP); Takeshi Matsuzawa, Tokyo (JP); Takahiro Fujii, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,608

(22) Filed: Jan. 13, 2023

(65) Prior Publication Data

US 2023/0141701 A1 May 11, 2023

Related U.S. Application Data

(63) Continuation of application No. 17/315,968, filed on May 10, 2021, now Pat. No. 11,577,165, which is a (Continued)

(30) Foreign Application Priority Data

Nov. 5, 2012 (JP) ................................ 2012-243801

(51) Int. Cl.
*G06F 3/02* (2006.01)
*A63F 13/20* (2014.01)
(Continued)

(52) U.S. Cl.
CPC .............. *A63F 13/42* (2014.09); *A63F 13/20* (2014.09); *A63F 13/30* (2014.09); *G06F 3/02* (2013.01);
(Continued)

(58) Field of Classification Search
CPC .......... A63F 13/42; A63F 13/20; A63F 13/30; A63F 13/12; A63F 2300/407;
(Continued)

(56) References Cited

U.S. PATENT DOCUMENTS 5,779,548 A 7/1998 Asai
7,347,780 B1 3/2008 Best
(Continued)

FOREIGN PATENT DOCUMENTS

CN 101479782 A 7/2009
CN 101981589 A 2/2011
(Continued)

OTHER PUBLICATIONS

First Office Action for corresponding CN Application 201810422633.4, 26 pages, dated Dec. 21, 2021.
(Continued)

*Primary Examiner* — Lisa S Landis
(74) *Attorney, Agent, or Firm* — XSENSUS LLP

(57) ABSTRACT

Methods and apparatus provide for: generating image data for an application to be displayed on an output device; recording the image data generated by the image generating unit; and receiving operation information from an input device, where the recording includes storing the image data for an application for a predetermined period of time up to the point in time at which operation information is received during the receiving operation information from a specific input unit provided in the input device while displaying an application image.

20 Claims, 13 Drawing Sheets

Related U.S. Application Data continuation of application No. 16/682,155, filed on Nov. 13, 2019, now Pat. No. 11,033,816, which is a continuation of application No. 14/438,398, filed as application No. PCT/JP2013/004372 on Jul. 17, 2013, now Pat. No. 10,516,724.

(51) Int. Cl.

| | | |
|---|---|---|
| *A63F 13/30* | (2014.01) | |
| *A63F 13/42* | (2014.01) | |
| *G06F 40/169* | (2020.01) | |
| *H04L 67/12* | (2022.01) | |
| *G06F 3/00* | (2006.01) | |
| *G06F 3/048* | (2013.01) | |
| *G06F 3/0487* | (2013.01) | |
| *G06F 3/14* | (2006.01) | |
| *H04L 67/06* | (2022.01) | |

(52) U.S. Cl.
CPC ............ *G06F 40/169* (2020.01); *H04L 67/12* (2013.01); *A63F 2300/407* (2013.01); *A63F 2300/554* (2013.01); *A63F 2300/556* (2013.01); *G06F 3/00* (2013.01); *G06F 3/048* (2013.01); *G06F 3/0487* (2013.01); *G06F 3/14* (2013.01); *H04L 67/06* (2013.01)

(58) Field of Classification Search
CPC ......... A63F 2300/554; A63F 2300/556; G06F 3/00; G06F 3/02; G06F 3/0487
See application file for complete search history.

(56) References Cited

U.S. PATENT DOCUMENTS

| | | | |
|---|---|---|---|
| 8,543,622 | B2 | 9/2013 | Giblin |
| 8,597,123 | B2 | 12/2013 | Tanaka |
| 9,242,173 | B2 | 1/2016 | Kwon |
| 2001/0001091 | A1 | 5/2001 | Asai |
| 2003/0001847 | A1 | 1/2003 | Doyle |
| 2003/0032467 | A1 | 2/2003 | Mayer |
| 2004/0250286 | A1 | 12/2004 | Fraser |
| 2006/0205518 | A1 | 9/2006 | Dzhon |
| 2008/0113812 | A1 | 5/2008 | Kwon |
| 2008/0141131 | A1 | 6/2008 | Cerny |
| 2008/0256463 | A1 | 10/2008 | Li |
| 2009/0131177 | A1 | 5/2009 | Pearce |
| 2009/0209335 | A1 | 8/2009 | Pearce |
| 2011/0083111 | A1 | 4/2011 | Forutanpour |
| 2011/0276881 | A1 | 11/2011 | Keng |
| 2012/0027256 | A1 | 2/2012 | Kiyohara |
| 2012/0086630 | A1 | 4/2012 | Zhu |
| 2012/0162251 | A1* | 6/2012 | Minamino ............ G11B 27/34 345/660 |
| 2012/0276998 | A1 | 11/2012 | Zhu |
| 2013/0130800 | A1 | 5/2013 | Sirilux |
| 2013/0239003 | A1 | 9/2013 | Usenko |
| 2014/0040803 | A1 | 2/2014 | Briand |
| 2014/0053078 | A1 | 2/2014 | Kannan |
| 2014/0075385 | A1 | 3/2014 | Wan |
| 2016/0045832 | A1 | 2/2016 | Pearce |
| 2016/0048989 | A1 | 2/2016 | Gabbidon |

FOREIGN PATENT DOCUMENTS

| | | |
|---|---|---|
| CN | 102075618 A | 5/2011 |
| CN | 102441276 A | 5/2012 |
| CN | 102646161 A | 8/2012 |
| EP | 2098271 A2 | 9/2009 |
| EP | 2441505 A2 | 4/2012 |
| EP | 2515513 A1 | 10/2012 |
| JP | 07261922 A | 10/1995 |
| JP | 2000-333121 A | 11/2000 |
| JP | 2001006270 A | 1/2001 |
| JP | 2003117239 A | 4/2003 |
| JP | 2005318987 A | 11/2005 |
| JP | 2006006853 A | 1/2006 |
| JP | 2006-180411 A | 7/2006 |
| JP | 2008532687 T | 8/2008 |
| JP | 2009-504098 A | 1/2009 |
| JP | 201000119 A | 1/2010 |
| JP | 2010035968 A | 2/2010 |
| JP | 2010517186 A | 5/2010 |
| JP | 2011512172 A | 4/2011 |
| JP | 2012096027 A | 5/2012 |
| JP | 2012125644 | 7/2012 |
| JP | 2014-092991 A | 5/2014 |
| KR | 20100118986 A | 11/2010 |
| RU | 2402068 C2 | 10/2010 |
| RU | 2408085 C2 | 12/2010 |
| WO | 9600601 A1 | 1/1996 |
| WO | 01/25944 A1 | 4/2001 |
| WO | 03081447 A1 | 10/2003 |
| WO | 2009094611 A2 | 7/2009 |
| WO | 2011041427 A2 | 4/2011 |

OTHER PUBLICATIONS

International Search Report for corresponding PCT Application PCT/JP2013/004372, 2 pages, dated Oct. 22, 2013.
Office Action for corresponding Japanese Application JP2012243801, pp. 1-6, dated Feb. 23, 2016.
Office Action for corresponding Korean Application 10-2015-7011174, 5 pages, dated Mar. 18, 2016.
Examination Report for corresponding Australian Application No. 2013340248, 4 pages, dated Apr. 1, 2016.
International Preliminary Report on Patentability and Written Opinion for corresponding PCT Application PCT/JP2013/004372, 13 pages, dated May 14, 2015.
Office Action for corresponding MX Application MX/a/2015/005537, 4 pages, dated Jun. 3, 2015.
Office Action for corresponding CA Application 2,890,315, 5 pages, dated May 10, 2016.
Office Action for corresponding RU Application 201521375, 11 pages, dated Jul. 14, 2016.
Office Action for corresponding CN Application 2013800563908, 25 pages, dated Mar. 31, 2017.
Office Action for corresponding JP Patent Application 2016-080150, 10 pages, dated Jun. 13, 2017.
European Search Report for corresponding EP Patent Application 17180127.7, 7 pages, dated Nov. 15, 2017.
Office Action for corresponding JP Patent Application No. 2017-180560, 8 pages, dated Oct. 2, 2018.
Office Action for corresponding KR Application No. 10-2019-7012176, 9 pages, dated Jun. 20, 2019.
Preliminary Report for corresponding JP Application No. 2017-180560, 8 pages, dated Aug. 28, 2019.
Notice of Reasons for Refusal for corresponding Japanese Patent Application No. 2017-180560, 4 pages, dated May 28, 2020.
Elecom news release, "16 Button type and PS 3/PC, which can share a lots of shortcut" and 12 button type high performance USB game pads 2 products which are compatible with each other, https://web.archive.org/web/20090717154657/https:/www.elecom.co.jp/news/200907/jc-u3016f/ 3 pages, Jul. 17, 2009 (for relevancy see Notice of Reasons for Refusal for corresponding Japanese Patent Application No. 2017-180560).
Reconsideration Report by Examiner before Appeal for corresponding Japanese Patent Application No. 2019-126784, 8 pages, dated Mar. 5, 2021.
Office Action dated Jun. 6, 2023 in Japanese Patent Application No. 2022-076479, 8 pages.
Nintendo Switch, a method of photographing a 30 second play video, a gamer information. net [online], 2021 / info.net/nintendo, https://gamers-info.net/nintendo-switch-picture-movie/, search on May 29, 2023, 12 pages. (with English translation of JP Office Action dated Jun. 6, 2023 in JP 2022-076479).

* cited by examiner

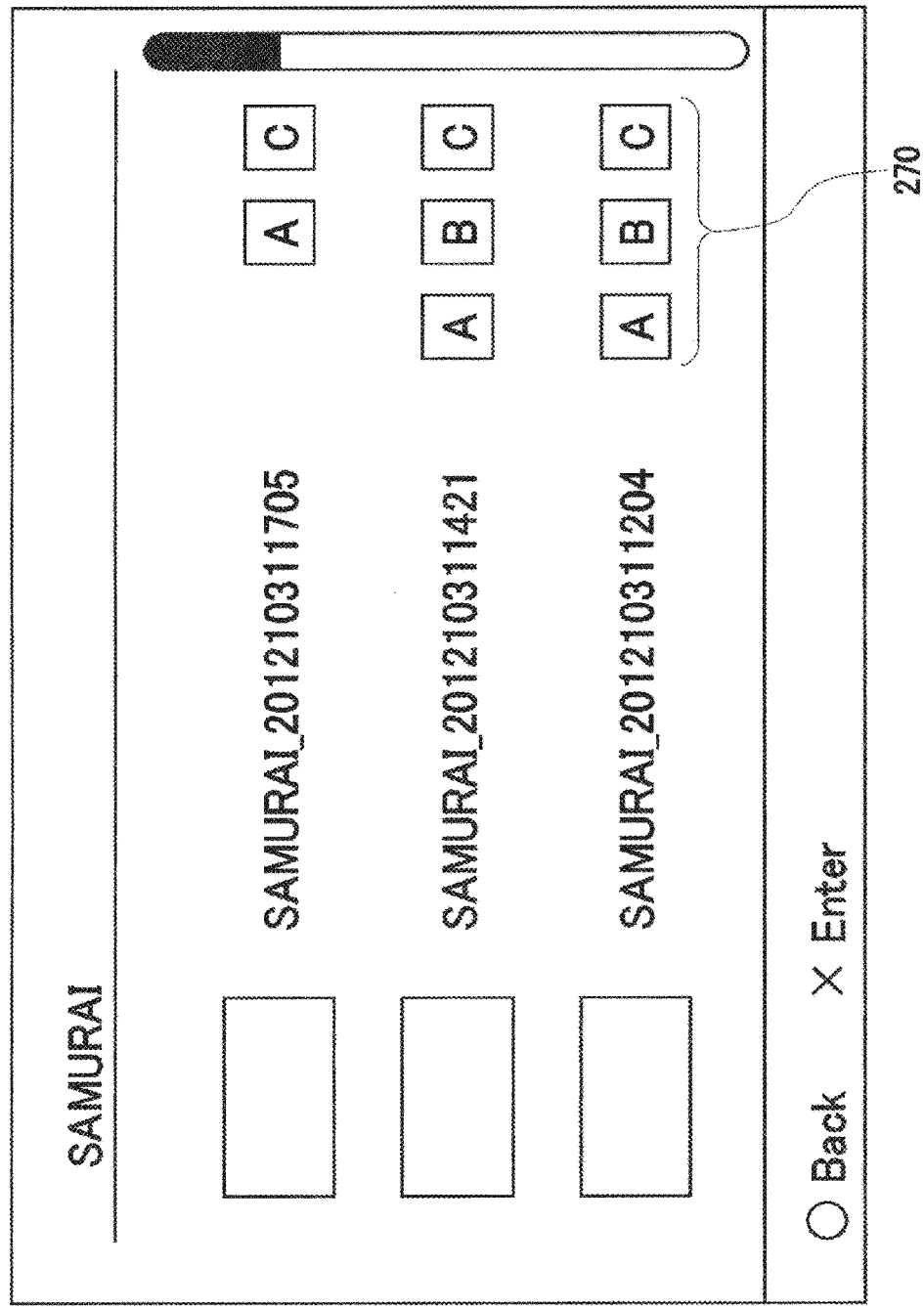

INFORMATION PROCESSING APPARATUS AND INPUTTING APPARATUS FOR SHARING IMAGE DATA

CROSS REFERENCE TO RELATED APPLICATIONS

This is a continuation application of U.S. patent application Ser. No. 17/315,968, filed May 10, 2021, which is a continuation application of U.S. patent application Ser. No. 16/682,155, filed Nov. 13, 2019 (now U.S. Pat. No. 11,033,816), which is a continuation application of U.S. patent application Ser. No. 14/438,398, filed Apr. 24, 2015 (now U.S. Pat. No. 10,516,724), which is a national phase application of International Application No. PCT/JP2013/004372, filed Jul. 17, 2013, which claims priority to Japanese Application No. JP 2012-243801, filed Nov. 5, 2012, the entire disclosures of each are hereby incorporated by reference.

TECHNICAL FIELD

The present invention relates to a technology for sharing image data or information relating to image data.

BACKGROUND ART

As a communication tool for many people, various social networking services (SNS) are being utilized. Also a service for sharing a moving picture prepared or captured by a user has become widespread, and a user can share various pieces of information with different users on a network.

SUMMARY

Technical Problem

In recent years, environments in which a plurality of users can play a game together through the Internet have been prepared. Such a network service of a game as just described already has a role as a communication tool, and construction of a mechanism by which information can be shared efficiently between friends or with strangers is demanded. It is to be noted that it is preferable for information to be shared efficiently not only in a game but also in a different type of a network service in which a plurality of information processing apparatus are connected to each other.

Therefore, it is an object of the present invention to provide a technology for sharing information.

Solution to Problem

In order to solve the problem described above, according to an aspect of the present invention, there is provided an information processing apparatus. The information processing apparatus includes an image generation unit configured to generate image data to be displayed on an outputting apparatus, an acceptance unit configured to accept operation information of inputting units provided in an inputting apparatus, and a sharing processing unit configured to carry out, when the acceptance unit accepts operation information of particular one of the inputting units provided in the inputting apparatus, a process of sharing the image data generated by the image generation unit or information relating to the image data.

According to another aspect of the present invention, there is provided an inputting apparatus configured to transmit operation information of a user to an information processing apparatus. The inputting apparatus includes a first inputting unit configured to input operation information to system software of the information processing apparatus, a second inputting unit configured to input operation information to application software of the information processing apparatus, and a third inputting unit configured to input operation information to any one of the system software and the application software of the information processing apparatus.

According to a further aspect of the present invention, there is provided an inputting apparatus configured to transmit operation information of a user to an information processing apparatus. The inputting apparatus includes an inputting unit configured to input operation information for causing the information processing apparatus to carry out a process of sharing a content or information relating to the content, and a communication module configured to transmit the operation information to the information processing apparatus.

It is to be noted that also arbitrary combinations of the constituent elements described above and the representations of the present invention obtained by conversion thereof between a method, an apparatus, a system, a recording medium, a computer program and so forth are effective as modes of the present invention.

BRIEF DESCRIPTION OF DRAWINGS

FIG. 13 is a diagram depicting a content list screen image.

DESCRIPTION OF EMBODIMENT

Figure 1:
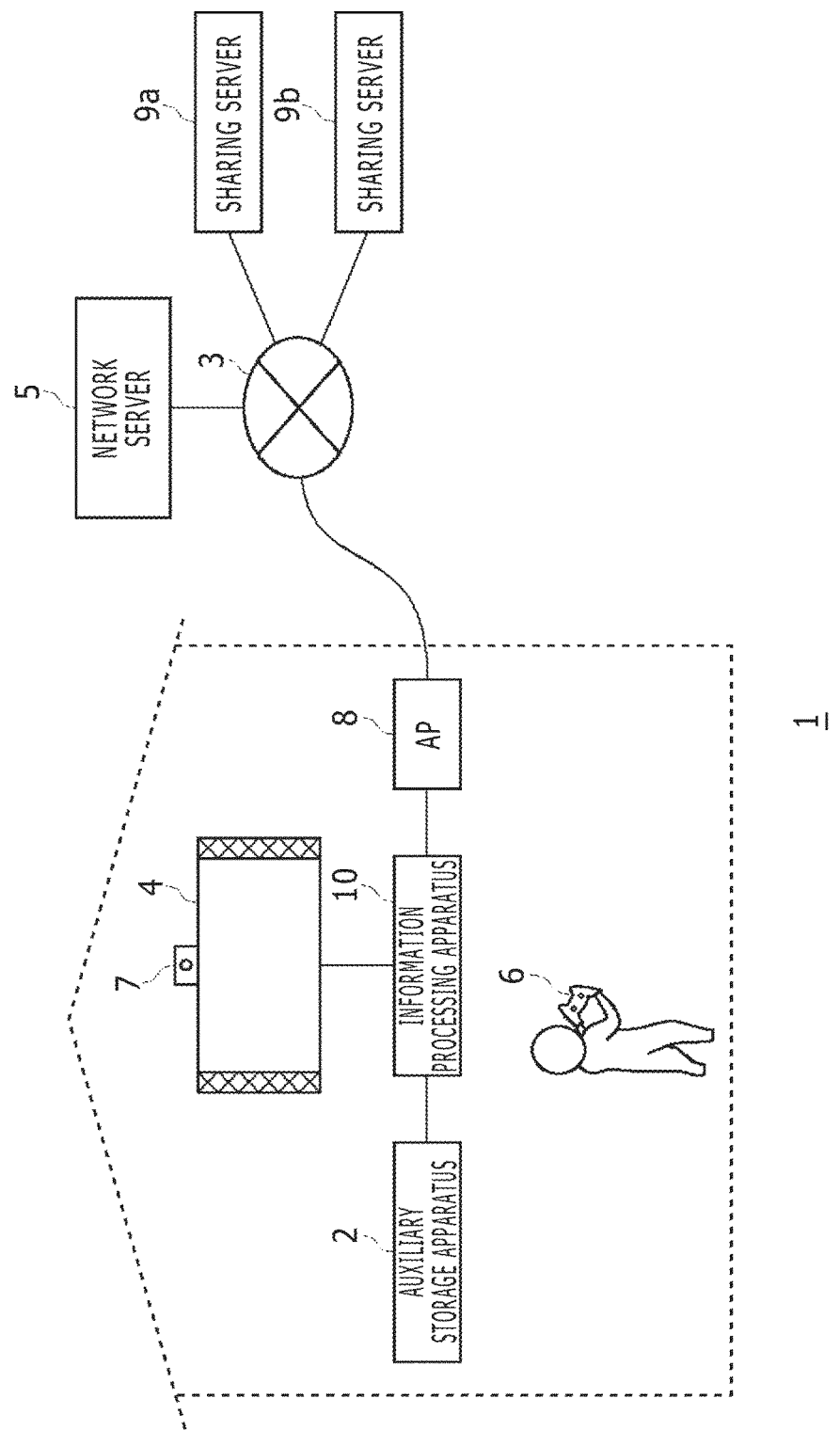
FIG. 1 is a diagram depicting an information processing system according to an embodiment of the present invention.

FIG. 1 depicts an information processing system 1 according to an embodiment of the present invention. The information processing system 1 includes an information processing apparatus 10 which is a user terminal, a network server 5, and sharing servers 9*a* and 9*b*. The components of the information processing system 1 are connected to each other by a network 3 such as the Internet or a LAN (Local Area Network).

An auxiliary storage apparatus 2 is a mass storage device such as an HDD (Hard Disk Drive) or a flash memory and may be an external storage apparatus connected to the information processing apparatus 10 by a USB (Universal Serial Bus) or the like or may be a built-in storage apparatus. An outputting apparatus 4 may be a television set which includes a display unit configured to output an image and a speaker configured to output sound or may be a computer display unit. The outputting apparatus 4 may be connected to the information processing apparatus 10 by a wire cable or may be connected wirelessly. The information processing apparatus 10 connects to an inputting apparatus 6, which is operated by a user, by wireless connection, and the inputting apparatus 6 outputs operation information representative of a result of the operation of the user to the information processing apparatus 10. The information processing apparatus 10 accepts the operation information from the inputting apparatus 6 and reflects the operation information on processing of system software or application software and then causes a result of the processing to be outputted from the outputting apparatus 4.

The inputting apparatus 6 is configured having a plurality of inputting units including a plurality of operation buttons of the push type, an analog stick which can input an analog quantity and turning buttons. In the information processing system 1, the information processing apparatus 10 is a game apparatus which executes a game, and the inputting apparatus 6 may be an apparatus which supplies operation information of a user to the information processing apparatus 10 such as a game controller. A camera 7 which is an image pickup apparatus is provided in the proximity of the outputting apparatus 4 and picks up an image of a space around the outputting apparatus 4. While FIG. 1 depicts an example wherein the camera 7 is attached to an upper portion of the outputting apparatus 4, the camera 7 may otherwise be disposed sidewardly of the outputting apparatus 4. Whatever the case may be, the camera 7 is disposed at a position at which the camera 7 can pick up an image of a user who plays a game in front of the outputting apparatus 4. The information processing apparatus 10 has a function of authenticating the face of the user from a picked up image of the camera 7.

An access point (hereinafter referred to as "AP") 8 has functions of a wireless access point and a router, and the information processing apparatus 10 connects to the AP 8 by wireless or wire connection to establish connection for communication with the network server 5 and the sharing servers 9a and 9b on the network 3.

The network server 5 provides a network service of a game to users of the information processing system 1. The network server 5 manages network accounts for identifying the users, and a user would use its network account to sign in to the network service provided by the network server 5. By signing in to the network service from the information processing apparatus 10, the user can register save data of a game or a virtual award article (trophy) acquired during game play into the network server 5. Further, in the information processing system 1, a plurality of users may participate in an online game using different information processing apparatuses 10 from each other, and the network server 5 may function as a game server which manages sessions of a game.

In FIG. 1, the network server 5 is represented as a server in which those functions are consolidated. Accordingly, the network server 5 may be configured physically from a plurality of servers, each of which may be maintained and managed by an entity corresponding to a function allocated thereto.

The sharing servers 9a and 9b provide a service for sharing image data uploaded or distributed from the information processing apparatus 10 or information relating to such image data. For example, the sharing server 9a may be a server which provides an SNS, and the sharing server 9b may be a server which provides an image sharing (distribution) service. In the following description, where the sharing servers 9a and 9b are not distinguished from each other, each of them is referred to simply as "sharing server 9." In the information processing system 1, the number of sharing servers 9 is not limited to two as depicted in FIG. 1 but may be a greater number. In the information sharing service provided by the sharing servers 9, the users of interest may be limited to registered members or may be open to the general. In the present embodiment, "to share data or information" signifies to establish a state in which a user other than users who upload or distribute data or information to the sharing server 9 can access (for example, browse) the data or information, but does not make a question of whether or not a user who can access is limited to particular members.

Referring to FIG. 1, the information processing apparatus 10 executes a game, and the user plays the game operating the inputting apparatus 6. In order to play the game, the user would log in to OS (system software) of the information processing apparatus 10 and sign in to the network service provided by the network server 5 in order to store save data of the game or a trophy granted as a result of achievement of a mission in the game. The user logging in to the system software is managed with a user account registered in the information processing apparatus 10.

Figure 2:
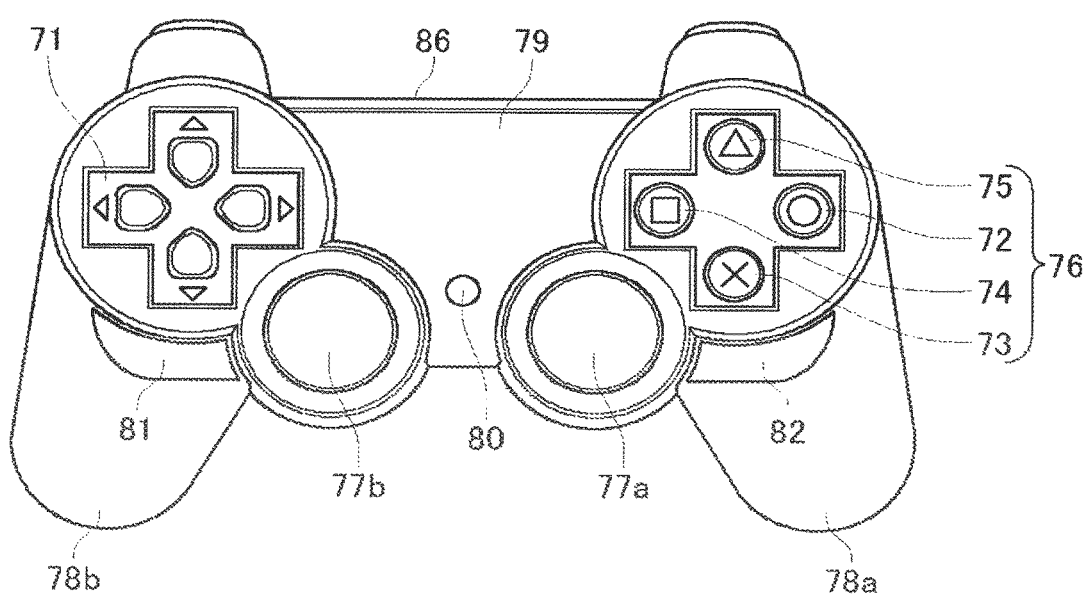
FIG. 2 is a diagram depicting an appearance configuration of an inputting apparatus.

FIG. 2 depicts an appearance configuration of the inputting apparatus 6. The user would grip a left side grip portion 78b by the left hand and grip a right side grip portion 78a by the right hand to operate the inputting apparatus 6. A direction key 71, analog sticks 77a and 77b and four kinds of operation buttons 76, which configure an inputting unit, are provided on a housing upper face 79 of the inputting apparatus 6. The four kinds of buttons 72 to 75 have different figures inscribed in different colors thereon in order to distinguish them from each other. In particular, a red round mark is inscribed on the ◯ button 72; a blue cross mark is inscribed on the ✕button 73; a violet square mark is inscribed on the ☐ button 74; and a green triangle mark is inscribed on the △button 75. On the housing upper face 79, a touch pad may be provided in a flat region between the direction key 71 and the operation buttons 76.

A function button 80 is provided between the two analog sticks 77a and 77b. The function button 80 is used to turn on the power supply to the inputting apparatus 6 and simultaneously make active a communication function of connecting the inputting apparatus 6 and the information processing apparatus 10 to each other. It is to be noted that, when the main power supply to the information processing apparatus 10 is in an off state, if the function button 80 is depressed, the information processing apparatus 10 accepts a connection request transmitted from the inputting apparatus 6 also as an instruction to turn on the main power supply. Consequently, the main power supply to the information processing apparatus 10 is turned on. After the inputting apparatus 6 is connected to the information processing apparatus 10, the function button 80 is used also to cause the information processing apparatus 10 to display a menu screen image.

A SHARE button 81 is provided on the left side of the left side analog stick 77b. The SHARE button 81 is utilized to input an instruction from the user to the system software in the information processing apparatus 10. An OPTION button 82 is provided on the right side of the right side analog stick 77a. The OPTION button 82 is utilized to input an instruction from the user to application (game) software executed by the information processing apparatus 10. The SHARE button 81 and the OPTION button 82 may each be formed as a push-type button.

Figure 3:
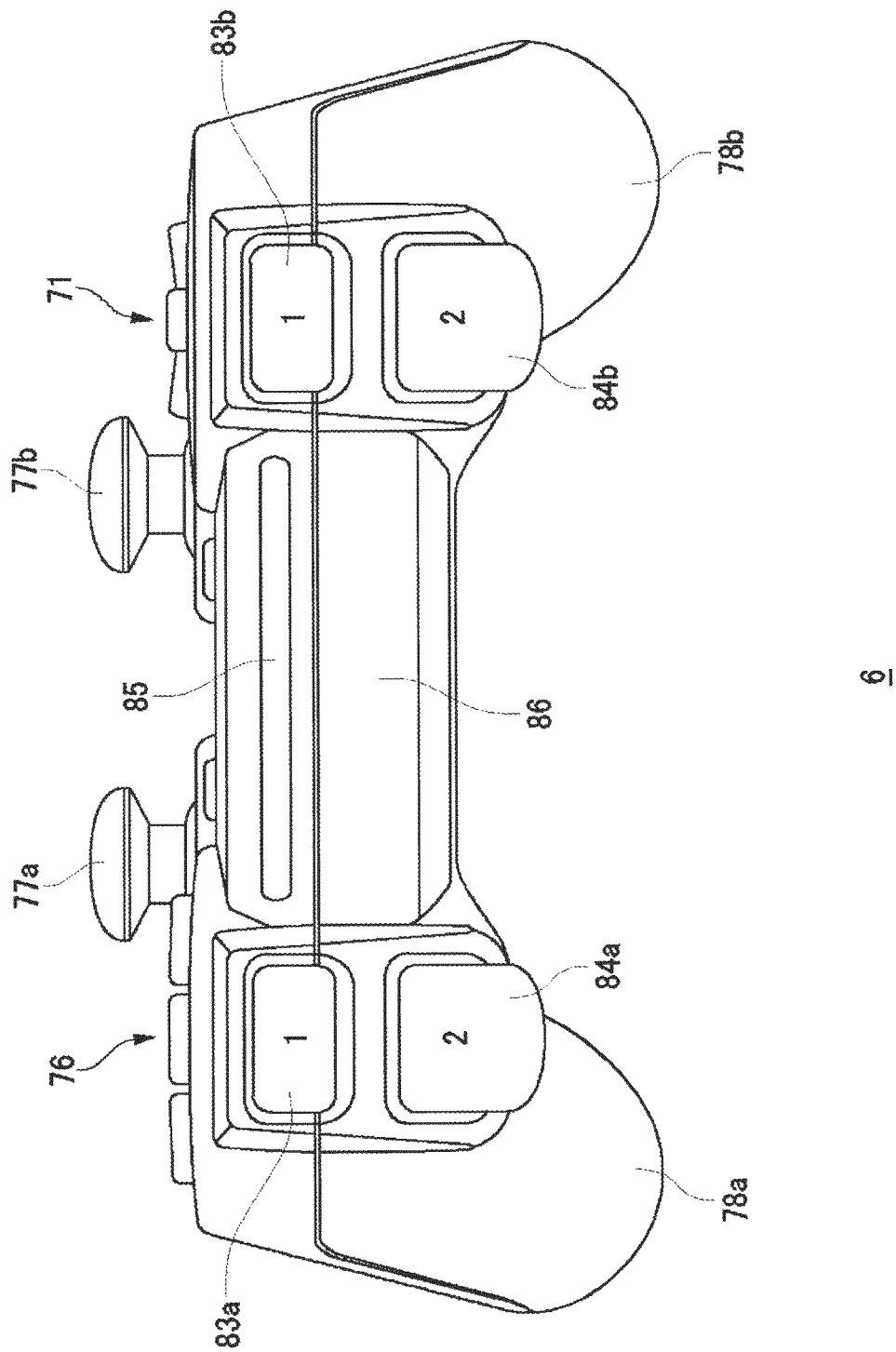
FIG. 3 is a diagram depicting an appearance configuration of the inputting apparatus on the rear face side.

FIG. 3 depicts an appearance configuration of the inputting apparatus 6 on the rear face side. A light emitting region 85 of a horizontally elongated substantially rectangular shape is provided on a housing rear face 86 of the inputting apparatus 6. The light emitting region 85 has LEDs of red (R), green (G) and blue (B), which are turned on in accordance with emission light color information transmitted from the information processing apparatus 10. On the housing rear face 86, an upper side button 83a, a lower side button 84a and another upper side button 83b, another lower side button 84b are provided at left-right symmetrical positions in a longitudinal direction. The upper side button 83a and the lower side button 84a are operated by the forefinger and the middle finger of the right hand of the user, respectively, and the upper side button 83b and the lower side button 84b are operated by the forefinger and the middle finger of the left hand of the user, respectively. Since the light emitting region 85 is provided between the row of the upper side button 83a and the lower side button 84a on the right side and the row of the upper side button 83b and the lower side button 84b on the left side as depicted in FIG. 3, the camera 7 can suitably pick up an image of the light emitting region 85 that has been turned on while the light emitting region 85 is not hidden by the forefinger or the middle finger by which a button is operated. The upper side buttons 83 may be configured as the push type buttons, and the lower side buttons 84 may be configured as the trigger type buttons which are rotatably supported.

Figure 4:
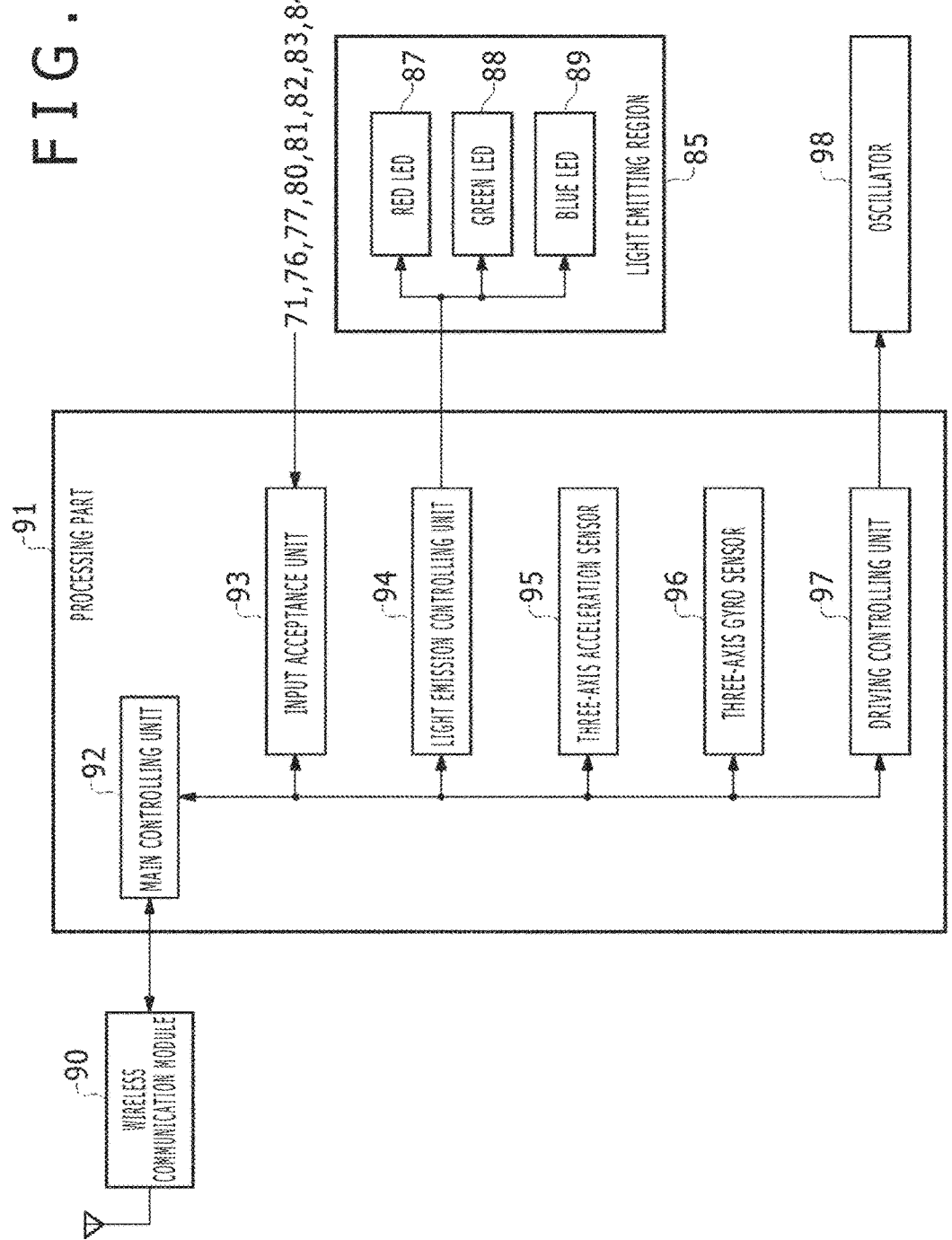
FIG. 4 is a diagram depicting an internal configuration of the inputting apparatus.

FIG. 4 depicts an internal configuration of the inputting apparatus 6. The inputting apparatus 6 includes a wireless communication module 90, a processing part 91, the light emitting region 85 and an oscillator 98. The wireless communication module 90 has a function of transferring data to and from a wireless communication module of the information processing apparatus 10. The processing part 91 executes expected processing of the inputting apparatus 6.

The processing part 91 has a main controlling unit 92, an input acceptance unit 93, a light emission controlling unit 94, a three-axis acceleration sensor 95, a three-axis gyro sensor 96 and a driving controlling unit 97. The main controlling unit 92 carries out transfer of necessary data to and from the wireless communication module 90.

The input acceptance unit 93 accepts operation information of an inputting unit such as the direction key 71, operation buttons 76, analog sticks 77, function button 80, SHARE button 81, OPTION button 82, upper side buttons 83 and lower side buttons 84 and transmits the operation information to the main controlling unit 92. The main controlling unit 92 supplies the received operation information to the wireless communication module 90, and the wireless communication module 90 transmits the operation information at a predetermined timing to the information processing apparatus 10. It is to be noted that the main controlling unit 92 may convert the received operation information into predetermined control information as occasion demands.

The light emission controlling unit 94 controls emission of light of a red LED 87, a green LED 88 and a blue LED 89 which configure the light emitting region 85. If the information processing apparatus 10 transmits emission light color information for designating an emission light color of the light emitting region 85, then the emission light color information from the information processing apparatus 10 is received by the wireless communication module 90 and is passed to the main controlling unit 92. The main controlling unit 92 notifies the light emission controlling unit 94 of the emission light color information. Consequently, the light emission controlling unit 94 can control the light emitting region 85 to emit light of the designated emission light color.

The oscillator 98 is configured including an eccentric motor and is provided in order to oscillate the entire inputting apparatus 6. When the wireless communication module 90 receives an oscillation controlling signal from the information processing apparatus 10, it supplies the oscillation controlling signal to the main controlling unit 92, and the main controlling unit 92 controls the driving controlling unit 97 to cause the oscillator 98 to oscillate in accordance with the oscillation controlling signal. The driving controlling unit 97 may be configured as a switch for driving the oscillator 98 or may be configured as a PWM controlling unit which varies the duty ratio of a supply voltage.

The three-axis acceleration sensor 95 detects acceleration components in three-axis directions of XYZ of the inputting apparatus 6. The three-axis gyro sensor 96 detects angular velocities on an XZ plane, a ZY plane and a YX plane. The main controlling unit 92 accepts detection value information from the three-axis acceleration sensor 95 and the three-axis gyro sensor 96, and the wireless communication module 90 transmits the detection value information to the information processing apparatus 10 in a predetermined cycle together with operation information of a button input or the like.

Figure 5:
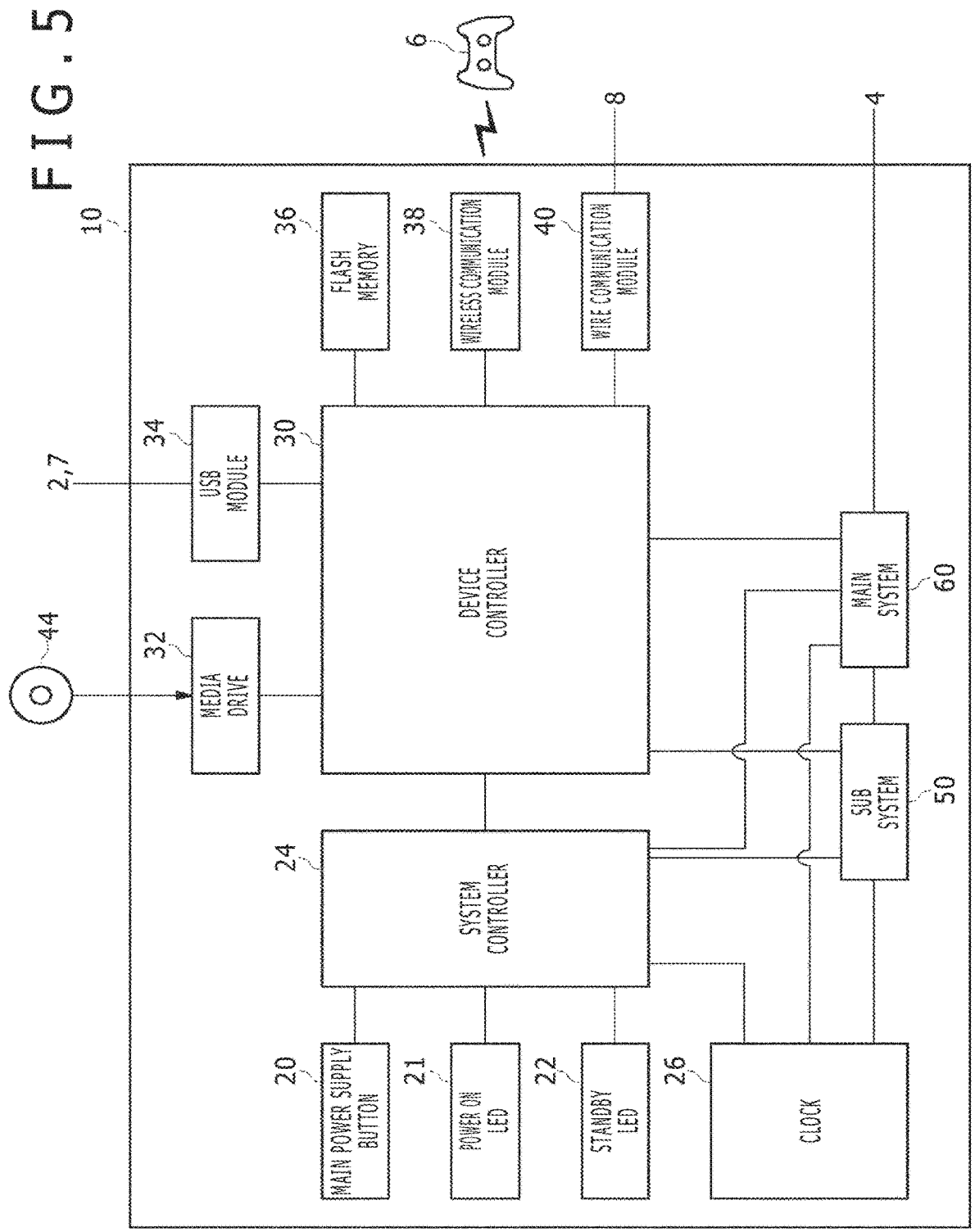
FIG. 5 is a diagram depicting a functional block diagram of an information processing apparatus.

FIG. 5 depicts a functional block diagram of the information processing apparatus 10. The information processing apparatus 10 is configured including a main power supply button 20, a power ON LED 21, a standby LED 22, a system controller 24, a clock 26, a device controller 30, a media drive 32, a USB module 34, a flash memory 36, a wireless communication module 38, a wire communication module 40, a sub system 50 and a main system 60.

The main system 60 is configured having a main CPU (Central Processing Unit), and the sub system 50 is configured having a sub CPU. The main CPU and the sub CPU operate exclusively. While the main CPU is started and is in an active state, the sub CPU is in a standby state, but while the sub CPU is started and is in an active state, the main CPU is in a standby state. While the main power supply to the information processing apparatus 10 remains on, the main CPU executes various processes of an application or the like under an environment generated by system software while the sub CPU is asleep. On the other hand, if the main power supply to the information processing apparatus is turned off, then the main CPU starts up the sub CPU and enters an asleep state. In this manner, the main CPU and the sub CPU operate exclusively.

The main power supply button 20 is an inputting unit to which an operation input from the user is carried out and is provided on a front face of a housing of the information processing apparatus 10 such that it is operated in order to turn on or off the power supply to the main system 60 of the information processing apparatus 10. In the following description, that the main power supply is in an on state signifies that the main system 60 is in an active state, and that the main power supply is in an off state signifies that the main system 60 is in a standby state. The power ON LED 21 is turned on when the main power supply button 20 is turned on, and the standby LED 22 is turned on when the main power supply button 20 is turned off. It is to be noted that such a configuration that turning on/off of the main power supply is carried out by a short press operation of the main power supply button 20 but, if the main power supply button 20 is long-pressed, then the system power supply to the information processing apparatus 10 is turned off to stop the power supply to the information processing apparatus 10 may be adopted.

The system controller 24 detects depression of the main power supply button 20 by the user. If the main power supply button 20 is depressed while the main power supply is in an off state, then the system controller 24 acquires the depression operation as an "on instruction," but if the main power supply button 20 is depressed while the main power supply is in an on state, then the system controller 24 acquires the depression operation as an "off instruction." It is to be noted that turning on/off of the main power supply can be controlled from the inputting apparatus 6 as described hereinabove, and if the function button 80 of the inputting apparatus 6 is depressed when the main power supply is in an off state, then the system controller 24 acquires the button operation as an "on instruction."

If the system controller 24 acquires an on instruction, then it notifies the sub system 50, which is in an active state, of a result of the detection and turns off the standby LED 22 while it turns on the power ON LED 21. At this time, the sub system 50 starts up the main system 60 and itself enters a standby mode. On the other hand, if the system controller 24 acquires an off instruction, then it notifies the main system 60, which is in an active state, of a result of the detection and turns off the power ON LED 21 while it turns on the standby LED 22. At this time, the main system 60 starts up the sub system 50 and itself enters a standby mode.

While the main CPU has a function of executing a game program installed in the auxiliary storage apparatus 2, the sub CPU does not have the function. However, the sub CPU has a function of accessing the auxiliary storage apparatus 2 and another function of transferring information to and from the network server 5. The sub CPU is configured having only such limited processing functions and accordingly can operate with lower power consumption than the main CPU.

The clock 26 is a real time clock, and generates date and time information at present and supplies the generated information to the system controller 24, sub system 50 and main system 60.

The device controller 30 is configured as an LSI (Large-Scale Integrated Circuit) which executes delivery of information between devices like a south bridge. As depicted in FIG. 5, such devices as the system controller 24, media drive 32, USB module 34, flash memory 36, wireless communication module 38, wire communication module 40, sub system 50 and main system 60 are connected to the device controller 30. The device controller 30 absorbs a difference in electric characteristic, a difference in data transfer rate between the devices and controls the timing of data transfer.

The media drive 32 is a drive apparatus which operates a ROM medium 44, on which application software of a game or the like is recorded, loaded thereon to read out a program, data and so forth from the ROM medium 44. The ROM medium 44 is a read-only recording medium such as an optical disk, a magneto-optical disk or a Blu-ray disk.

The USB module 34 is a module to be connected to an external apparatus by a USB cable. The USB module 34 may be connected to the auxiliary storage apparatus 2 and the camera 7 by a USB cable. The flash memory 36 is an auxiliary storage apparatus which configures an internal storage. The wireless communication module 38 wirelessly communicates, for example, with the inputting apparatus 6 using a communication protocol such as a Bluetooth (registered trademark) protocol or an IEEE 802.11 protocol. It is to be noted that the wireless communication module 38 may be compatible with a third generation (3rd Generation) digital portable telephone system compliant with the IMT-2000 (International Mobile Telecommunication 2000) standard prescribed by the ITU (International Telecommunication Union). The wire communication module 40 wire-communicates with an external apparatus and is connected to the network 3, for example, through the AP 8.

The main system 60 includes a main CPU, a memory which is a main storage apparatus and a memory controller, a GPU (Graphics Processing Unit) and so forth. The GPU is utilized principally for arithmetic processing of a game program. Those functions may be configured as a system-on-chip and formed on one chip. The main CPU has a function of starting up system software and executing an application installed in the auxiliary storage apparatus 2 under an environment provided by the system software.

The sub system 50 includes a sub CPU, a memory which is a main storage apparatus, a memory controller and so forth but does not include a GPU. The number of circuit gates of the sub CPU is smaller than the number of circuit gates of the main CPU, and the operation power consumption of the sub CPU is lower than that of the main CPU. As described hereinabove, the sub CPU operates while the main CPU is in a standby state, and the processing functions of the sub CPU are limited in order to suppress the power consumption of the sub CPU low. It is to be noted that the sub CPU and the memory may be formed on chips separate from each other.

Figure 6:
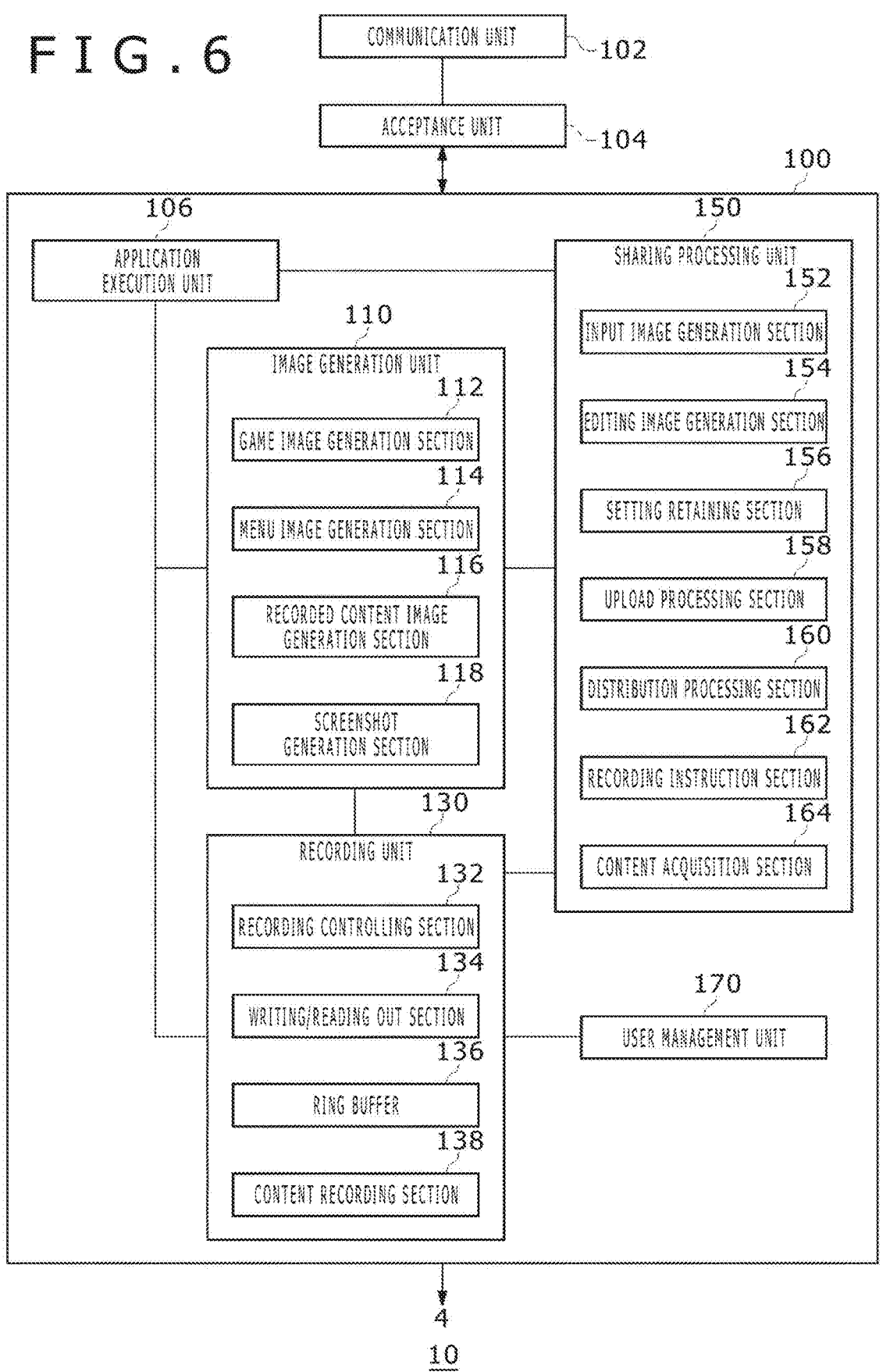
FIG. 6 is a diagram depicting an internal configuration of the information processing apparatus.

FIG. 6 depicts an internal configuration of the information processing apparatus 10. The information processing apparatus 10 includes a processing part 100, a communication unit 102 and an acceptance unit 104. The processing part 100 includes an application execution unit 106, an image generation unit 110, a recording unit 130, a sharing processing unit 150 and a user management unit 170. The image generation unit 110 generates image data to be displayed on the outputting apparatus 4 and has a game image generation section 112, a menu image generation section 114, a recorded content image generation section 116 and a screenshot generation section 118. The recording unit 130 records image data generated by the image generation unit 110 and/or information relating to the image data, and includes a recording controlling section 132, a writing/reading out section 134, a ring buffer 136 and a content recording section 138. The sharing processing unit 150 carries out processing for sharing image data generated by the image generation unit 110 and/or information relating to the image data with a different user. The sharing processing unit 150 includes an input image generation section 152, an editing image generation section 154, a setting retaining section 156, an upload processing section 158, a distribution processing section 160, a recording instruction section 162 and a content acquisition section 164. The user management unit 170 retains a user account of a log-in user and a device ID of the inputting apparatus 6 in an associated relationship with each other. While the user is playing a game, the user management unit 170 specifies and stores the user who is playing the game.

The components represented as functional blocks which carry out various processes in FIG. 6 can be configured, in hardware, from a circuit block, a memory and other LSIs, and is implemented, in software, by a program and so forth loaded in the memory. Accordingly, it can be recognized by those skilled in the art that the functional blocks can be implemented in various forms only from hardware, only from software or from a combination of hardware and software and are not limited to any of them.

In the information processing system 1 of the present embodiment, the communication unit 102 receives information of an operation made to an inputting unit of the inputting apparatus 6 by the user (such information is hereinafter referred to as "operation information") and transmits a content generated or acquired by the processing part 100 to the sharing server 9. Here, the content includes at least image data generated by the image generation unit 110 and/or information relating to the image data. The communication unit 102 is configured such that it has both of functions of the wireless communication module 38 and the wire communication module 40 depicted in FIG. 5. The wireless communication module 38 takes charge of communication with the inputting apparatus 6 and the wire communication module 40 takes charge of communication with the network server 5 and the sharing server 9.

The acceptance unit 104 is provided between the communication unit 102 and the processing part 100 and transmits data or information to and from the communication unit 102 and the processing part 100. If the acceptance unit 104 accepts operation information of an inputting unit provided in the inputting apparatus 6 through the communication unit 102, then it supplies the operation information to one, two or more of the application execution unit 106, image generation unit 110, sharing processing unit 150 and user management unit 170 of the processing part 100.

If the main power supply button 20 is depressed by the user in a state in which the main power supply to the information processing apparatus 10 is off, then the main system 60 is started up. The main system 60 supplies a generation instruction of a menu image to the menu image generation section 114, and the menu image generation section 114 generates a menu image in which icon images of games and so forth are arrayed. It is to be noted that the menu image generation section 114 may generate a menu image when the user depresses the function button 80 of the inputting apparatus 6 in a state in which the main power supply to the information processing apparatus 10 is on. The function of the menu image generation section 114 is implemented by system software.

Figure 7:
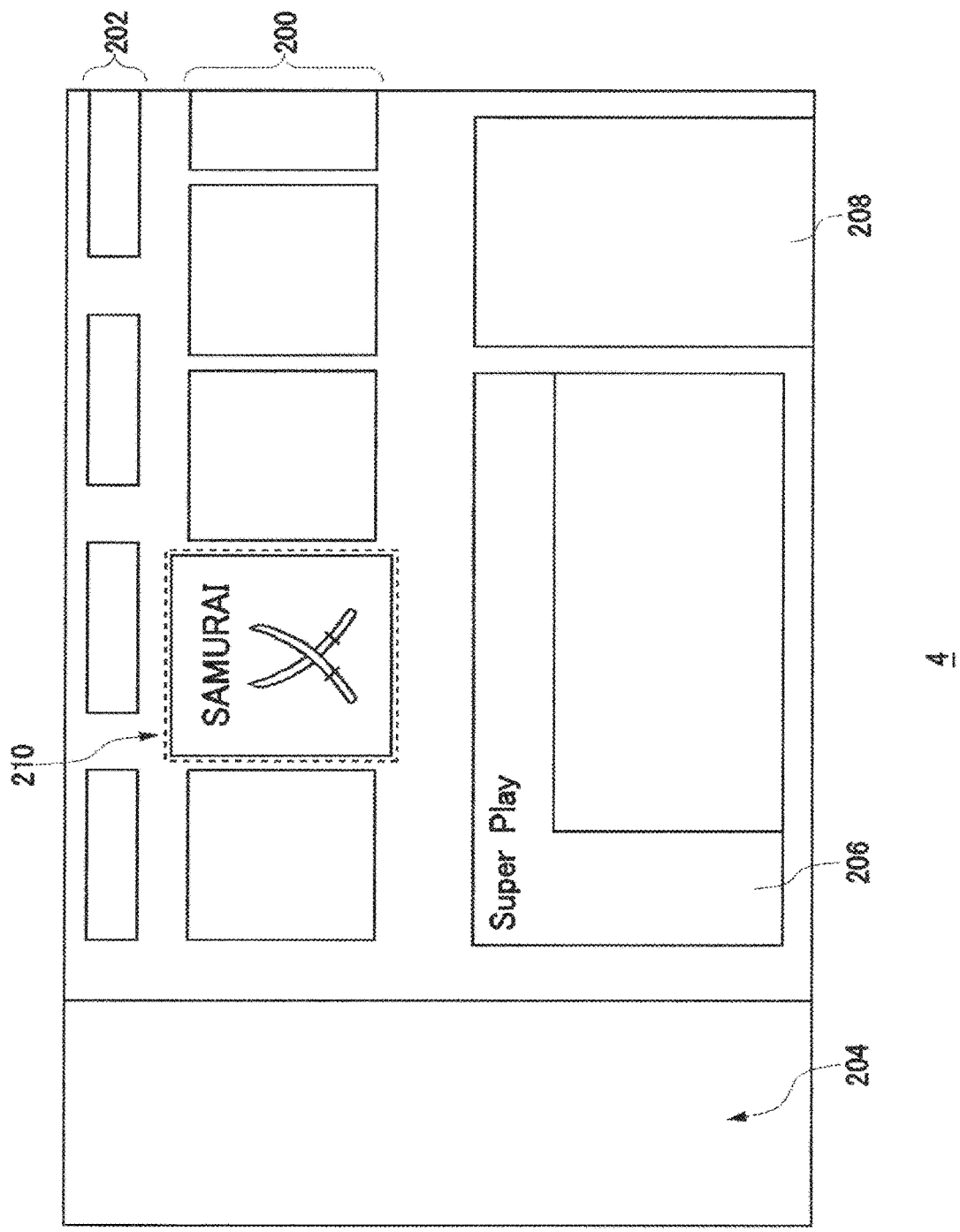
FIG. 7 is a diagram depicting an example of a menu screen image displayed on an outputting apparatus.

FIG. 7 depicts an example of a menu screen image displayed on the outputting apparatus 4. The menu screen image is displayed when the user is to select a game to be played or when the user browses activities of other users. In a category selection region 204, categories of menus prepared in the information processing apparatus 10 are displayed. In a game icon display region 200, icons of games which can be played by a log-in user are displayed in a list in a horizontal direction of the screen. The user can operate the inputting apparatus 6 to scroll the list rightwardly or leftwardly. In the game icon display region 200, a focus region 210 is set at a predetermined position, and if a game icon in which the user is interested is placed into the focus region 210, then icons relating to the game are displayed in a relating icon display region 202 and relating information is displayed in relating information display regions 206 and 208. If the user operates an inputting unit of the inputting apparatus 6 to place the icon of a game to be played into the focus region 210 and then depresses a predetermined determination key, then the acceptance unit 104 depicted in FIG. 6 accepts the operation information as a game execution command. Thus, the application execution unit 106 executes the game.

In the relating information display region 206, relating information to the game placed in the focus region 210 is displayed, and, for example, a moving picture relating to the game is displayed. The moving picture displayed may be a play moving picture of the game accumulated in the sharing server 9 or a live moving picture distributed from the sharing server 9. In the relating information display region 208, relating information to the game placed in the focus region 210 is displayed, and, for example, a list of friends who are playing the game may be displayed. The menu image generation section 114 generates such a menu image and displays the menu image from the outputting apparatus 4.

If an execution command of a game is inputted by the user, then the application execution unit 106 executes a program of the game placed in the focus region 210. In the present example, a game of the title "SAMURAI" is started. The user management unit 170 specifies which user or users are playing the game from among users who have logged in to the information processing apparatus 10. For example, if a user A starts the game and log-in users B and C participate in the game, then it is stored that the users A, B and C are playing the game.

Figure 8:
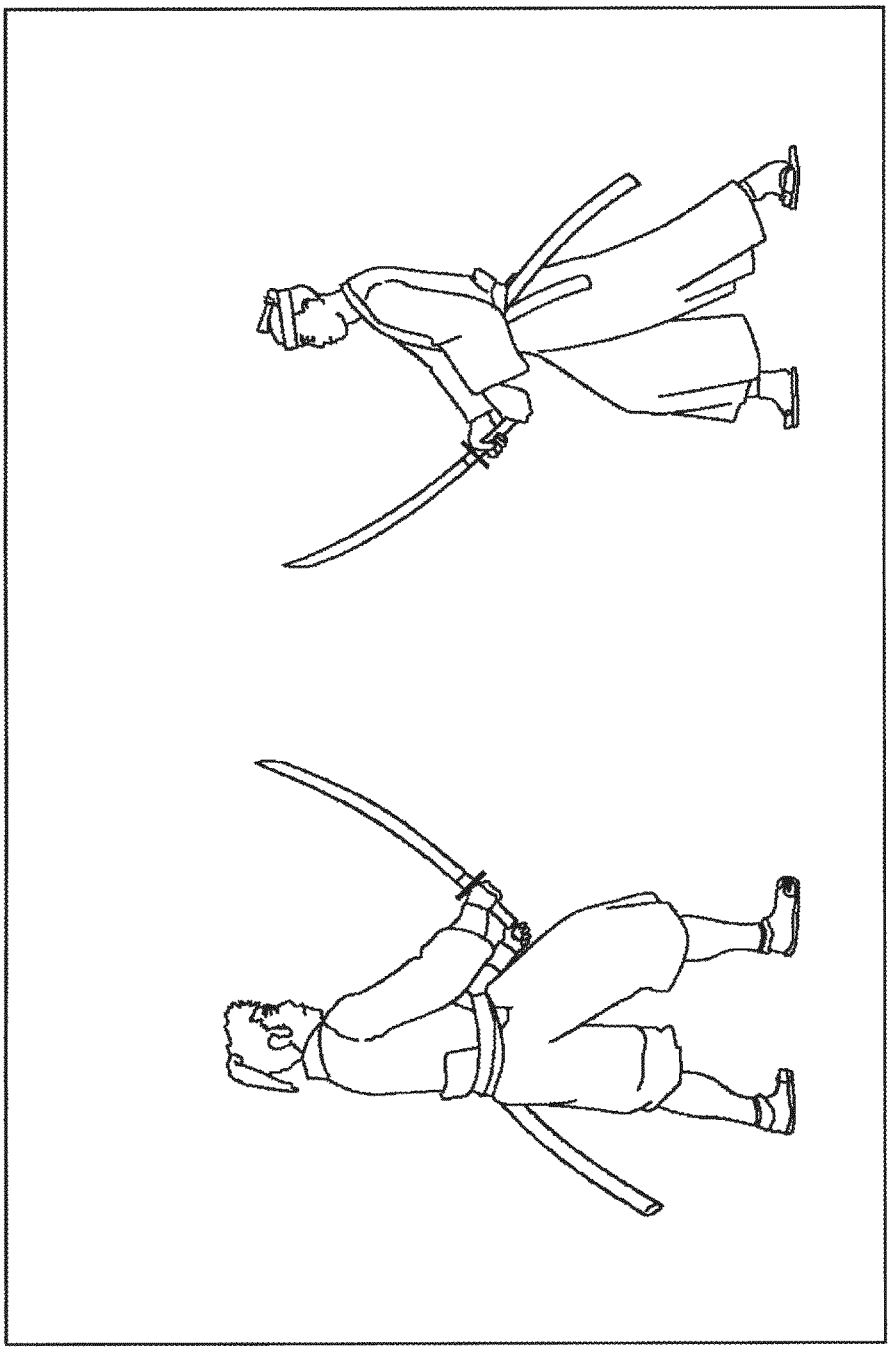
FIG. 8 is a diagram depicting an example of a game screen image displayed on the outputting apparatus.

While the application execution unit 106 in the present embodiment executes a game program, it may otherwise execute a different kind of an application program. The application execution unit 106 carries out arithmetic operation processing for moving a game character in a virtual space based on operation information inputted to the inputting apparatus 6 from the user. Here, the application execution unit 106 may be an application (game program) itself. The game image generation section 112 may be a GPU (Graphics Processing Unit) which executes a rendering process or the like, and receives a result of processing by the application execution unit 106 and generates image data of the application (game) to be displayed on the outputting apparatus 4. FIG. 8 depicts an example of a game screen image displayed on the outputting apparatus 4.

In the information processing apparatus 10, the recording unit 130 has a function of recording an image displayed on the outputting apparatus 4 on the background. While the image generation unit 110 has a function of generating at least menu image data and game image data and displaying the generated data on the outputting apparatus 4 as depicted in FIGS. 7 and 8, the recording unit 130 records the image data on the background.

The recording controlling section 132 controls writing and reading out processes of data by the writing/reading out section 134. The writing/reading out section 134 writes or read out data into or from the ring buffer 136 and the content recording section 138. The background recording in the recording unit 130 is carried out by the ring buffer 136. The recording controlling section 132 sets a start address and an end address of a storage region of the auxiliary storage apparatus 2 to generate the ring buffer 136. This ring buffer region may be set in advance upon shipment of the information processing apparatus 10. The recording controlling section 132 records image data generated by the image generation unit 110 into the ring buffer 136. The recording controlling section 132 records image data in the order of addresses determined in advance from the start address into the ring buffer 136. When the recording up to the end address comes to an end, the recording controlling section 132 returns to the start address and carries out overwrite recording. The recording controlling section 132 then repeats the sequence of processes. By recording display image data on the background, for example, when the user performed a good play in a game, the user can record the game video and upload the game video to the sharing server 9. Further, by carrying out recording of the ring buffer type, the capacity of the auxiliary storage apparatus 2 can be prevented from being used limitlessly. For example, the recording capacity of the ring buffer 136 is set so as to allow recording of a moving picture for approximately 15 minutes.

The sharing processing unit 150 in the present embodiment provides a mechanism for sharing image data generated by the image generation unit 110 and/or information relating to the image data with other users. This sharing process is executed taking it as a trigger that a particular inputting unit provided on the inputting apparatus 6 is operated by the user.

Referring back to FIGS. 2 and 3, a plurality of inputting units provided on the inputting apparatus 6 can be classified into three types from a point of view of inputting of operation information to the information processing apparatus 10.

(First Type)

An inputting unit of the first type is configured to input operation information to the system software of the information processing apparatus 10, and particularly, the function button 80 and the SHARE button 81 belong to the first type. Operation information of the function button 80 and the SHARE button 81 is provided only to the system software but is not provided to the application software. Here, the system software signifies software for managing/controlling the hardware of the computer of the information processing apparatus 10 to support work or use of the information processing apparatus 10. Meanwhile, the application software signifies software which directly has a function of carrying out a work to be executed by the user in an environment constructed by the system software. Representatively, the system software includes the OS, and the application software includes game software.

(Second Type)

An inputting unit of the second type is configured to input operation information to the application software of the information processing apparatus 10, and particularly, the OPTION button 82 belongs to the second type. Operation information of the OPTION button 82 is provided only to the application software but is not provided to the system software.

(Third Type)

An inputting unit of the third type is configured to input operation information to any of the system software and the application software of the information processing apparatus 10, and particularly, the direction key 71, operation buttons 76, analog sticks 77, upper side buttons 83 and lower side buttons 84 belong to the third type. During display of a menu screen image (refer to FIG. 7) generated by the system software, operation information of an inputting unit of the third type is provided to the system software. However, during display of a game screen image (refer to FIG. 8) generated by the application software, operation information of an inputting unit of the third type is provided to the application software. In this manner, operation information of an inputting unit of the third type is provided to a generation entity of a screen image displayed on the outputting apparatus 4.

If the acceptance unit 104 accepts operation information of an inputting unit of the first type, particularly, of the SHARE button 81, from among the inputting units of the three types, then the sharing processing unit 150 carries out a process of sharing image data generated by the image generation unit 110 or information relating to the image data with a different user. This sharing process is not carried out when the acceptance unit 104 accepts operation information of an inputting unit of the second type or the third type, but is carried out absolutely only when operation information of an inputting unit of the first type is accepted.

In the following, a sharing process when the user operates the SHARE button 81 during display of a game screen image depicted in FIG. 8 is described.

As described hereinabove, during display of a game screen image, the ring buffer 136 of the recording unit 130 has recorded therein game image data generated by the game image generation section 112. When the acceptance unit 104 accepts operation information of the SHARE button 81, the recording instruction section 162 supplies a capturing instruction of a screenshot to the screenshot generation section 118 and supplies an instruction to stop background recording to the recording controlling section 132. Consequently, the screenshot generation section 118 captures a screenshot of a game image at a point of time at which the capturing instruction is accepted. Further, the recording controlling section 132 stops recording of image data into the ring buffer 136 at a point of time at which it receives a recording stopping instruction.

When the screenshot generation section 118 generates image data of a screenshot, it receives information relating to the screenshot provided thereto from the game and associates the relating information with the image data. Here, the relating information is attribute information (meta information) of the game such as, for example, a title ID, a title name and a stage name of the game being played and character names included in the screenshot and may further include information of the user who is playing the game. It is to be noted that also the recording controlling section 132 receives information relating to image data recorded in the ring buffer 136 supplied thereto from the game and associates the relating information with the image data. Here, the relating information is attribute information such as a title ID, a title name and a stage name of the game and character names included in the image data, and may include information of the user who is playing the game. It is to be noted that, since image data for 15 minutes at the longest is recorded in the ring buffer 136, the stage of the game may be changed or a character appearing in the game may change within a period of 15 minutes. Therefore, if the attribute information of the game changes, then the game notifies the recording controlling section 132 of the attribute information after the change every time. Then, at the point of time at which the notification is received, the recording controlling section 132 may associate the attribute information of the notification with image data to be recorded into the ring buffer 136.

At this time, the input image generation section 152 generates an input image indicative of choices relating to sharing of the game image data or information relating to the game image data. On the input screen image displayed on the outputting apparatus 4, a GUI (Graphical User Interface) or a text field for inputting predetermined information through an operation of the inputting apparatus 6 by the user is placed. In the following description, "game image data or information relating to the game image data" is sometimes referred to collectively as "content" for the convenience of description. On the inputting image, a GUI for selecting a content to be made an object of a sharing process is displayed.

Figure 9:
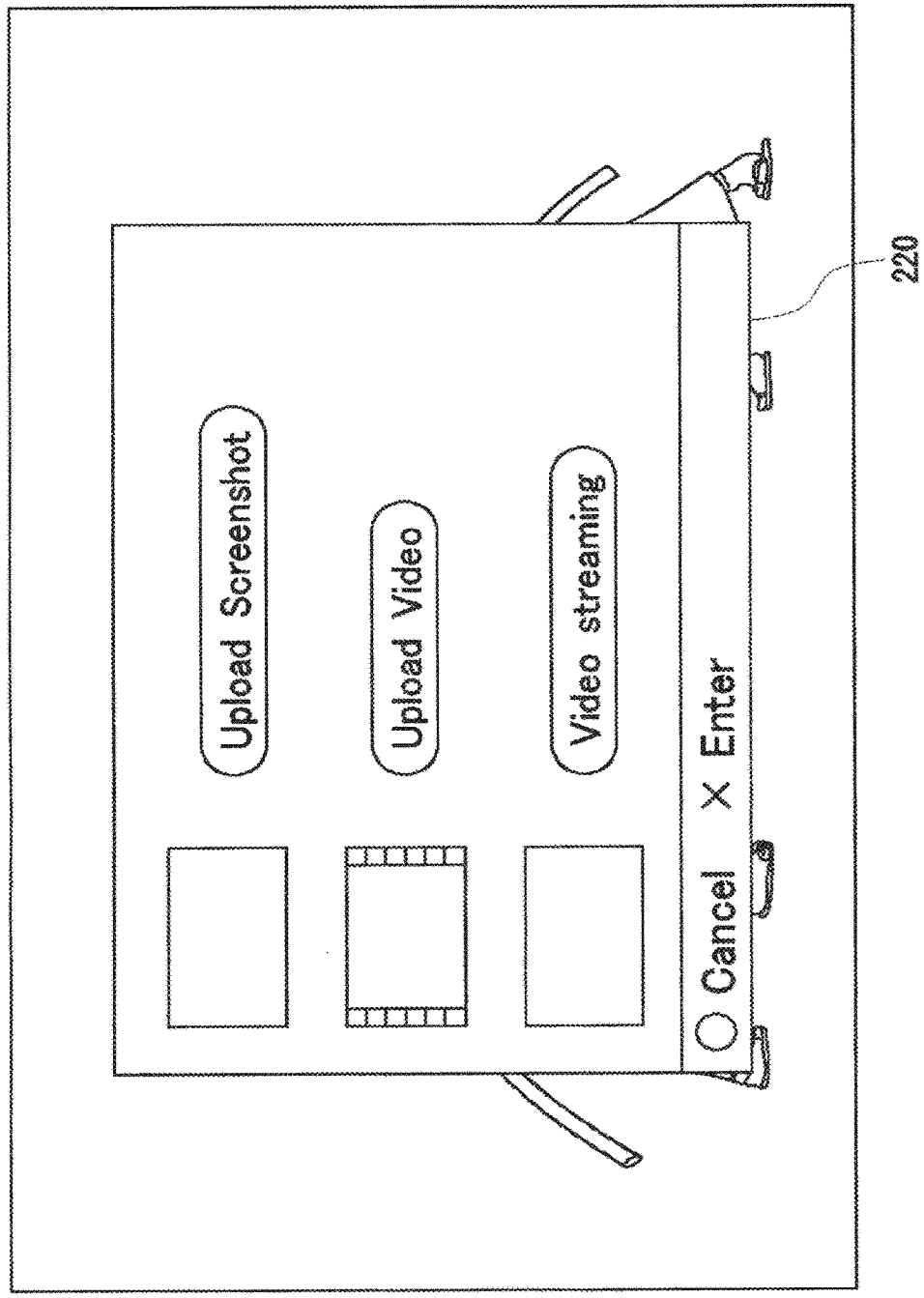
FIG. 9 is a diagram depicting an example of an inputting screen image displayed in an overlapping relationship on the game screen image.

FIG. 9 depicts an example of an input screen image displayed in an overlapping relationship on a game screen image. On the input screen image 220, three choices relating to content sharing are presented. "Upload Screenshot" is a GUI which designates uploading of image data of a screenshot; "Upload Video" is a GUI which designates uploading of image data recorded in the ring buffer 136; and "Video Streaming" is a GUI which designates live relaying of a play video of the game. The user would operate the inputting apparatus 6 to select one of the GUIs and depress the Enter key to execute the selected sharing process.

Figure 10:
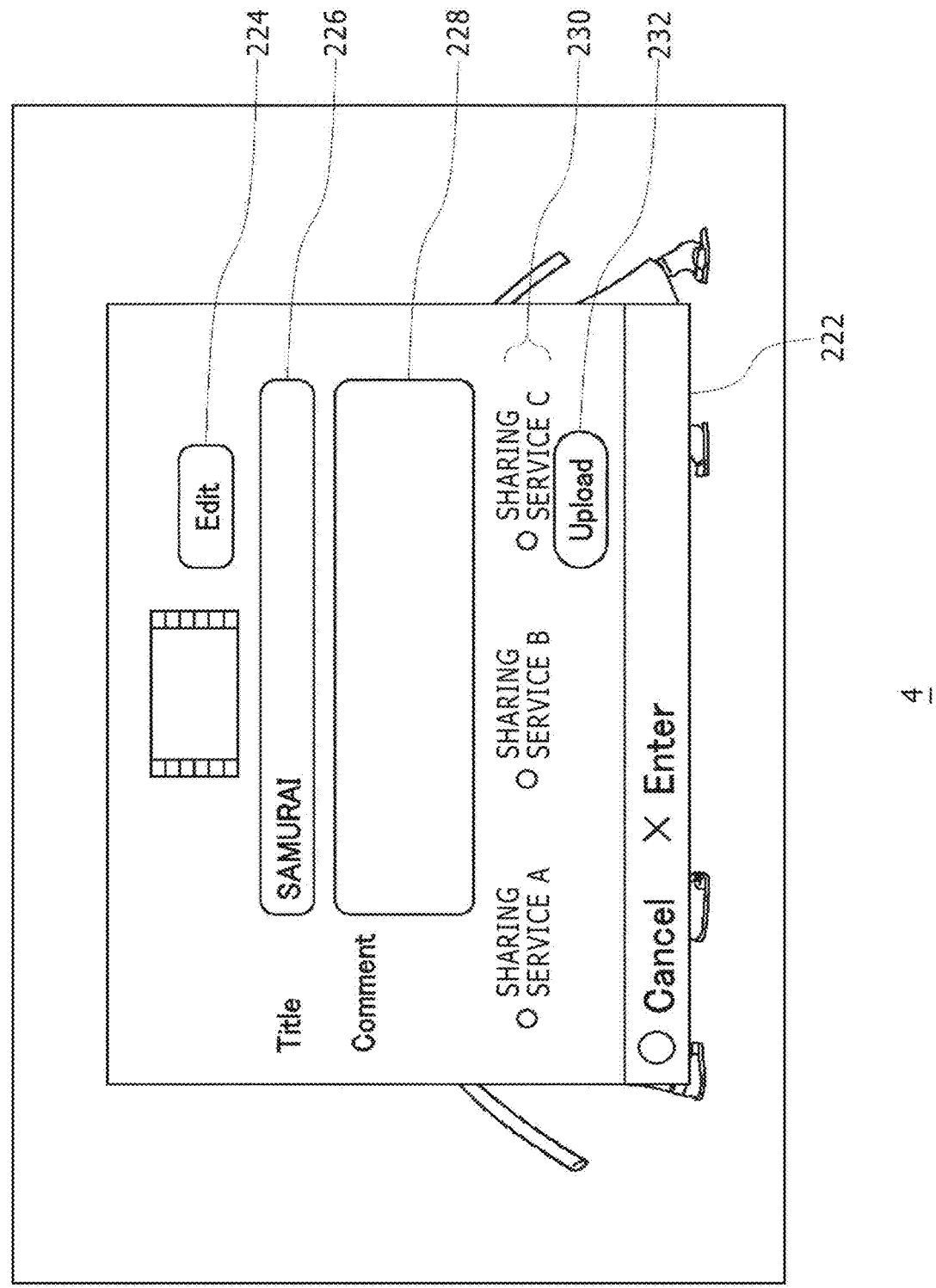
FIG. 10 is a diagram depicting another example of an inputting screen image displayed in an overlapping relationship on the game screen image.

FIG. 10 depicts an example of an input screen image displayed in an overlapping relationship on a game screen image when the "Upload Video" is selected. On the input screen image 222, choices relating to sharing of a content are indicated, and here, a service selection field 230 for inputting information regarding which one of content sharing services provided by a plurality of sharing servers 9 is to be selected is indicated. In this example, three choices of a sharing service A, another sharing service B and a further sharing service C are presented. Although the sharing services may be operated by different business entities, they may otherwise be operated by a single business entity, by which different kinds of services may be provided.

To a title inputting field 226, the user would input a game title. It is to be noted that image data is associated with a game title name as described hereinabove, and the input image generation section 152 may input the game title name associated with the image data to the title inputting field 226 in advance. The user can input a comment relating to a play moving picture by text into a comment inputting field 228. Since it is expected that, when a content is uploaded into a sharing service, an effect that the interest of a different user in the content is raised by browsing a comment displayed on a sharing site is exhibited, inputting of a comment has important implications in the sharing service.

An editing button 224 is utilized when image data recorded in the ring buffer 136 for 15 minutes at the longest is to be edited. If the editing button 224 is selected, then an editing screen image for editing image data is displayed on the outputting apparatus 4.

Figure 11:
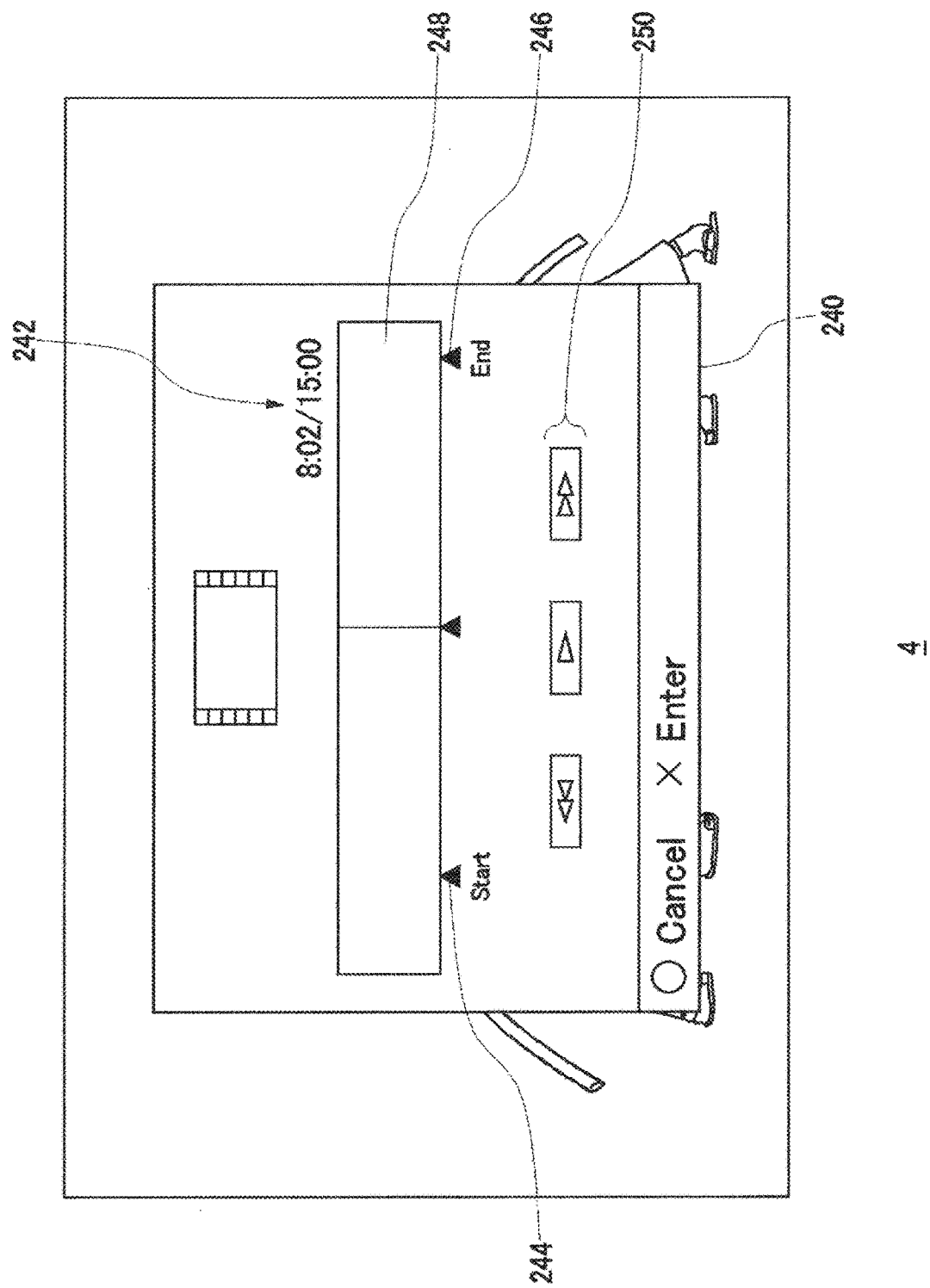
FIG. 11 is a diagram depicting an example of an editing screen image displayed in an overlapping relationship on the game screen image.

FIG. 11 depicts an example of an editing screen image displayed in an overlapping relationship on a game screen image. On the editing screen image 240, the user can determine a length of moving picture data to be uploaded. In particular, the user would determine a start point 244 and an end point 246 of moving picture data for 15 minutes at the longest to determine the moving picture data between the start point 244 and the end point 246 as an upload object. The user can freely move the start point 244 and the end point 246 by operating the inputting apparatus 6. In an image display region 248, moving picture data is reproduced, and the user would operate an indicator 250 such as a reproduction button, a fast feed button or a fast reverse button to determine a start point 244 and an end point 246 of moving picture data to be uploaded. The left end of the image display region 248 indicates the first of the moving picture data while the right end of the image display region 248 indicates the last of the moving picture data, and if the user places a cursor at an arbitrary position in the image display region 248, then an image existing at a corresponding position on a time axis may be displayed. Time information 242 represents time information of an image reproduced in the image display region 248. The user would set a start point 244 and an end point 246 and depress the Enter key to end image editing, whereupon the input screen image 222 depicted in FIG. 10 is restored. The recording controlling section 132 stores addresses of the start point 244 and the end point 246 set for the image data recorded in the ring buffer 136.

It is to be noted that, where recorded data for 15 minutes at the longest includes play images at a plurality of stages during a game, some mark may be set at a break of each stage and displayed on the editing screen image 240. By the display, the user can find out a break of a stage without reproducing the recorded play moving picture, and the setting process of the start point 244 and the end point 246 is facilitated. Further, at this time, an image at the break of the stage may be displayed in association with the mark in the image display region 248.

It is to be noted that, in a game, information for inhibiting recording is sometimes embedded in order to prevent revelation of the contents of the game. For example, at a high point of a game such as a special stage or a fight scene against a boss character, information for inhibition of recording is set. In the following description, a scene or a stage at which recording is inhibited is referred to as "inhibition interval." Thus, if the recording controlling section 132 receives recording inhibition information from a game, then it does not record game image data in the inhibition interval into the ring buffer 136. Accordingly, when the user depresses the SHARE button 81 intending to upload the moving picture data, such a situation that the moving picture data has not been recorded because the moving picture data then is actually in an inhibition interval possibly occurs. Therefore, if a capture interval of image data recorded in the ring buffer 136 includes a recording inhibition interval, it is preferable that a message indicating that some scene is not recorded is displayed on the editing screen image 240. It is to be noted that, in an inhibition interval, a mark indicative of the inhibition interval may be displayed also on a game screen image displayed on the outputting apparatus 4.

If the editing comes to an end and the input screen image 222 depicted in FIG. 10 is restored, then the user would select an upload button 232 an upload button 232. Consequently, the content acquisition section 164 generates an acquisition request for image data to the recording unit 130, and the recording controlling section 132 uses the addresses of the set start point 244 and end point 246 to read out edited image data recorded in the ring buffer 136 from the writing/reading out section 134 to the content acquisition section 164. Consequently, the content acquisition section 164 acquires the edited image data.

If the content acquisition section 164 acquires image data (content), then the upload processing section 158 uploads the content to the sharing server 9 which provides the sharing service selected in the service selection field 230 of the inputting screen image depicted in FIG. 10. Consequently, the moving picture played by the user is shared, and since the moving picture is exposed to the eyes of many people, increase of the popularity of the game is expected.

FIGS. 10 and 11 depict screen images displayed when the "Upload Video" is selected on the input screen image 220 depicted in FIG. 9. Also when the "Upload Screenshot" or the "Video Streaming" is selected on the input screen image 220, the input image generation section 152 similarly generates an inputting image indicative of choices relating to sharing of a content. It is to be noted that, when the "Upload Screenshot" is selected, the upload processing section 158 uploads image data of a screenshot to the sharing server 9, but when the "Video Streaming" is selected, the distribution processing section 160 encodes a game image generated by the game image generation section 112 and stream distributes the encoded game image to the sharing server 9. Thereupon, since a comment inputted from the user or attribute information of the game is displayed on the sharing site, a different user can rapidly find out the image in which the different user is interested.

If the acceptance unit 104 accepts operation information of the SHARE button 81, then the input image generation section 152 controls the outputting apparatus 4 to display the input screen image 220 for selecting a content to be shared as depicted in FIG. 9. However, the input image generation section 152 may cause a different inputting screen image to be displayed.

Figure 12:
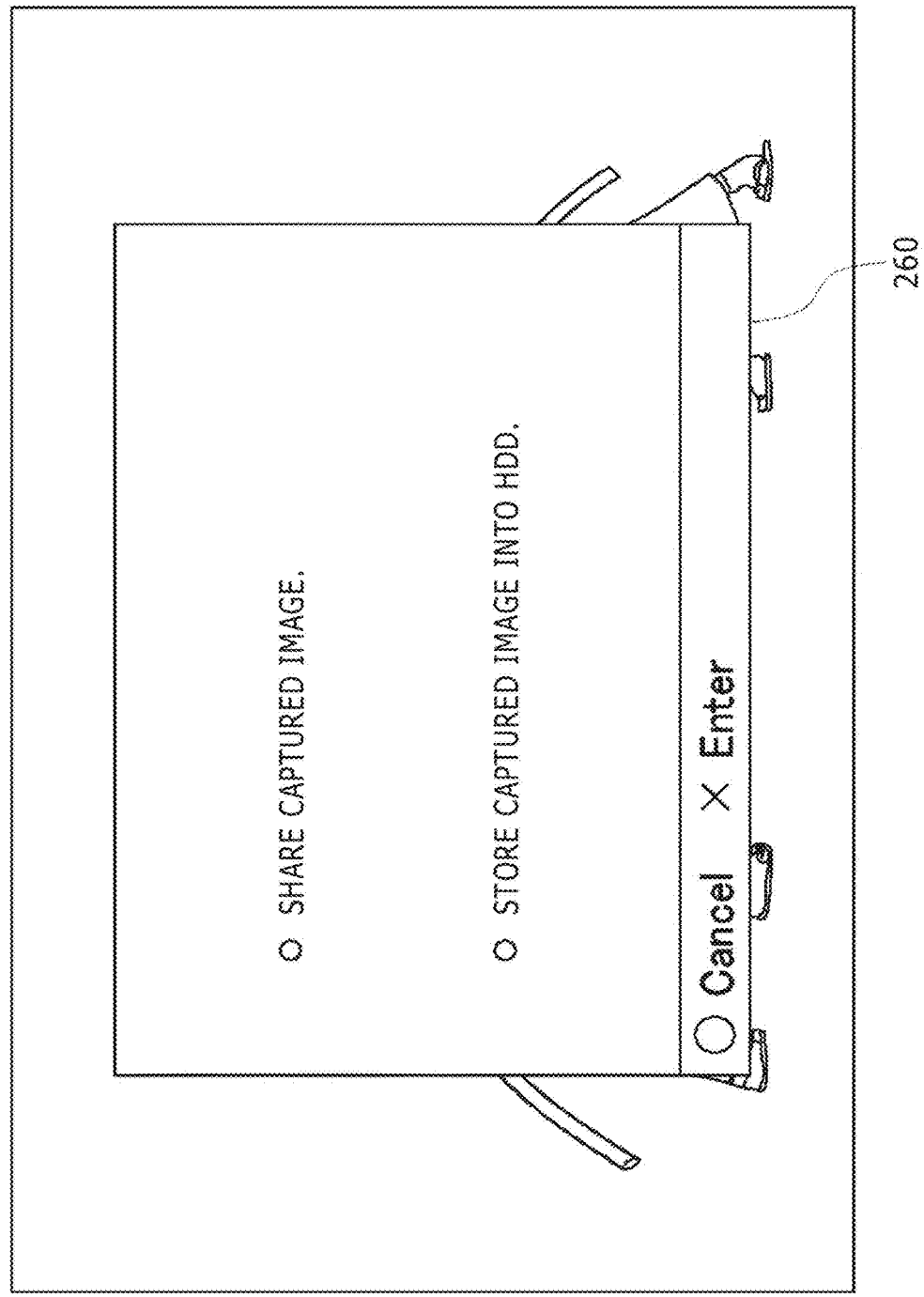
FIG. 12 is a diagram depicting a further example of an inputting screen image displayed in an overlapping relationship on the game screen image.

FIG. 12 depicts an example of an inputting screen image to be displayed in an overlapping relationship on a game screen image. On the input screen image 260, choices regarding whether a sharing process of image data is to be carried out or a saving process of image data is to be carried out are presented. If the sharing processing unit 150 accepts operation information of the SHARE button 81, then a sharing process is executed. On the other hand, however, since operation information of the SHARE button 81 is not provided to the game, the progress of the game does not stop. Since, in the sharing process, an inputting screen image or an editing screen image is displayed in an overlapping relationship on a game screen image as described hereinabove, a situation in which the user cannot substantially carry out a game operation occurs. Therefore, the user can continue the game by selecting a saving process of image data on the input screen image 260 to capture moving picture data tentatively. An editing process or an uploading process of the moving picture data may be carried out, for example, after the user pauses (stops once) the game progress or after the game ends.

It is to be noted that, since the progress of the game does not stop once in response to operation information of the SHARE button 81, the user may set the substance of the sharing process for operation information of the SHARE button 81 in advance to implement a rapid sharing process. The setting retaining section 156 retains information, for example, of the sharing service selected in the service selection field 230 depicted in FIG. 10. The selection of the sharing service is carried out by the user in advance, and the setting retaining section 156 retains information which specifies the sharing service selected by the user. While the service selection field 230 depicted in FIG. 10 presents choices when moving picture data is to be uploaded, for example, it is preferable for the user to select in advance a sharing service to be used when a screenshot is to be uploaded or a sharing service to be used when streaming distribution is to be carried out such that information for specifying the selected sharing service is retained as setting information in the setting retaining section 156.

In this case, when the acceptance unit 104 accepts operation information of the SHARE button 81, the sharing processing unit 150 determines, in response to an operation situation of the SHARE button 81, of which one of the sharing processes the setting information is to be adopted from within the setting information retained in the setting retaining section 156. Although the operation situation of the SHARE button 81 is typically identified between short press and long press, where three sharing processes including an uploading process of a screenshot, an uploading process of a capture moving picture and a streaming distribution process of a play video are prepared as in the present embodiment, operation situations such as short press, long press and press twice are associated with the sharing processes. For example, if the SHARE button 81 is pressed short, then the upload processing section 158 carries out an uploading process of a screenshot image in accordance with the setting information. If the SHARE button 81 is pressed long, then the upload processing section 158 carries out an uploading process of a capture moving picture in accordance with the setting information. If the SHARE button 81 is pressed twice, then the distribution processing section 160 carries out a streaming distribution process of a game image. Consequently, if the user merely operates the SHARE button 81, then a content can be uploaded or distributed without interruption of the game progress, and a sharing process of the content can be implemented more simply.

It is to be noted that the setting retaining section 156 may associate a predetermined sharing process and a process of indicating choices relating to sharing with operation situations of the SHARE button 81. For example, where the operation situation of the SHARE button 81 is distinguished between short press and long press, an uploading process of a screenshot image is associated with the short press operation, and a generation process for an inputting image for selecting one of an uploading process of a capture moving picture and streaming distribution of a game image is associated with the long press operation. At this time, if the SHARE button 81 is pressed short, then the upload processing section 158 carries out an uploading process of a screenshot image in accordance with the setting information. However, if the SHARE button 81 is pressed long, then the input image generation section 152 generates the GUI for the selection between "Upload Video" and "Video Streaming" depicted in FIG. 9 and displays the GUI on the outputting apparatus 4. Also in this case, if the setting retaining section 156 retains the short press operation of the SHARE button 81 and the uploading process of a screenshot image in an associated relationship with each other, then when the upload processing section 158 receives a short press operation, it can upload a screenshot image to the sharing server 9 without the necessity for any other input from the user.

It is to be noted that, while a case in which a sharing process of game image data is carried out in the information processing apparatus 10 is described, also the menu image data depicted in FIG. 7 may be processed for sharing and uploaded or distributed to the sharing server 9. If the user depresses the SHARE button 81 when a game icon of the title "SAMURAI" is displayed in the focus region 210 on the menu screen image, then icon image data of the title "SAMURAI" and/or information relating to the icon image data are posted to a sharing site so that they may be shared among a plurality of users. The information relating to game icon image data includes attribute information of the game and further includes related information of a sale site of the game, a play result of the user A and so forth. Since such information is placed into a browseable state in the sharing site, for example, a friend of the user A can know that the user A is interested in the "SAMURAI" game, and consequently, a motivation to play the game together with the user A can be provided to the friend of the user A.

If it is selected on the inputting screen image depicted in FIG. 12 that captured image data is to be locally retained, then the recording instruction section 162 generates a recording request for the captured image data to the recording unit 130. In the present embodiment, if the acceptance unit 104 accepts operation information of the SHARE button 81, then the recording instruction section 162 supplies a capture instruction of a screenshot to the screenshot generation section 118 and supplies a stopping instruction of background recoding to the recording controlling section 132. Thereafter, when the input image generation section 152 displays the inputting screen image depicted in FIG. 12 on the outputting apparatus 4 and the user selects that the capture image data is to be saved into the auxiliary storage apparatus 2, then the recording instruction section 162 supplies a recording request for the capture image data to the recording unit 130.

The recording controlling section 132 acquires image data of a screenshot generated by the screenshot generation section 118 and records the image data into the content recording section 138 by the writing/reading out section 134. Further, the recording controlling section 132 reads out image data recorded in the ring buffer 136 by the writing/reading out section 134 and records the image data into the content recording section 138. It is to be noted that image data of a screenshot can be generated from image data recorded in the ring buffer 136, the recording controlling section 132 may not record the image data of the screenshot into the content recording section 138.

The recording controlling section 132 records a content (image data) in an associated relationship with a log-in user. For example, if one of the three users A, B and C depresses the SHARE button 81 while the "SAMURAI" game is being played by the three users, then the recording controlling section 132 records the image data of the ring buffer 136 in an associated relationship with the user accounts of the users A, B and C. The log-in users who are playing the game are stored in the user management unit 170, and the recording controlling section 132 acquires information of the users who are playing the game from the user management unit 170 and associates the information with the image data. The recorded content image generation section 116 is a content browser, and generates a content list image recorded in the content recording section 138 and displays the content list image on the outputting apparatus 4.

FIG. 13 depicts a content list screen image. While, in the present example, the recorded content image generation section 116 generates a content list image for each game title, alto it is possible to generate a content list image for each user. On the content list screen image, for each content, user icons 270 of users who were playing upon generation of the content are displayed. Consequently, each user can know the other users who were playing the game together. It is to be noted that, when a content is uploaded to the sharing server 9, also user information may be uploaded such that the names of the users who played together are displayed on the sharing site together with comments and so forth.

The present invention has been described based on the embodiment thereof. This embodiment is illustrative, and it can be recognized by those skilled in the art that various modifications are possible in combination of the constituent elements and the processes of the embodiment and that also such modifications are included in the scope of the present invention.

REFERENCE SIGNS LIST

1 . . . Information processing system, 4 . . . Outputting apparatus, 5 . . . Network server, 6 . . . Inputting apparatus, 9 . . . Sharing server, 10 . . . Information processing apparatus, 20 . . . Main power supply button, 81 . . . SHARE button, 100 . . . Processing part, 102 . . . Communication unit, 104 . . . Acceptance unit, 106 . . . Application execution unit, 110 . . . Image generation unit, 112 . . . Game image generation section, 114 . . . Menu image generation section, 116 . . . Recorded content image generation section, 118 . . . Screenshot generation section, 130 . . . Recording unit, 132 . . . Recording controlling section, 134 . . . Writing/reading out section, 136 . . . Ring buffer, 138 . . . Content recording section, 150 . . . Sharing processing unit, 152 . . . Input image generation section, 154 . . . Editing image generation section, 156 . . . Setting retaining section, 158 . . . Upload processing section, 160 . . . Distribution processing section, 162 . . . Recording instruction section, 164 . . . Content acquisition section, 170 . . . User management unit Industrial Applicability The present invention can be utilized in a technical field for sharing image data or information relating to image data.

The invention claimed is:

1. An information processing system comprising:
   circuitry configured to
      generate image data for an application to be displayed on an output device;
      record the image data in memory;
      receive operation information from a second information processing system that includes a user interface, wherein
   the circuitry stores the image data for the application for a predetermined period of time up to a point in time at which the operation information is received from the second information processing system while the output device continues to display an application image.

2. The information processing system of claim 1, wherein the circuitry is configured to record the image data in a background.

3. The information processing system of claim 1, wherein the circuitry is configured to store image data for the application for the predetermined period of time as editable data.

4. The information processing system of claim 1, wherein the operation information received from the second information processing system is for system software of the information processing device.

5. The information processing system of claim 1, wherein the application is a game application configured to be executed by the information processing apparatus.

6. The information processing system of claim 5, wherein the image data corresponds to game play images produced by the circuitry during execution of the game application by the information processing apparatus.

7. The information processing system of claim 6, wherein the operation information received from the second information processing system corresponds to an operation to share the game play images produced by the circuitry.

8. The information processing system of claim 7, wherein the circuitry is configured to transmit the game play images produced by the circuitry to a third information processing system.

9. The information processing system of claim 8, wherein the third information processing system is one or more servers of a social networking service (SNS).

10. The information processing system of claim 1, wherein
   the information processing system is a server communicatively coupled to the second information processing system via at least one of a wired network and a wireless network.

11. The information processing system of claim 10, wherein
the circuitry comprises a central processing unit (CPU).

12. The information processing system of claim 1, wherein
the information processing system includes a plurality of servers communicatively coupled to the second information processing system via at least one of a wired network and a wireless network.

13. The information processing system of claim 12, wherein
the circuitry includes a plurality of central processing units (CPUs) communicatively coupled to one another and the second information processing system via at least one of a wired network and a wireless network.

14. The information processing system of claim 1, comprising:
the second information processing system device, wherein
the second information processing system includes the user interface.

15. The information processing system of claim 14, wherein
the second information processing system including the user interface is at least one of a video game controller and a mobile terminal communicatively coupled to the circuitry via at least one or more wired or wireless networks.

16. The information processing system of claim 1, wherein
the second information processing system is a gaming console, and
the user interface is a gaming controller that is communicatively coupled to the gaming console.

17. The information processing system of claim 1, wherein
the second information processing system includes the output device and the user interface.

18. The information processing system of claim 1, comprising:
the circuitry; and
the second information processing system, wherein
the second information processing system includes the user interface and is communicatively coupled to the circuitry via one or more wired and wireless networks.

19. A method performed by an information processing system, the method comprising:
generating image data for an application to be displayed on an output device;
recording the image data; and
receiving operation information from an input device, wherein
the recording includes storing the image data for the application for a predetermined period of time up to a point in time at which the operation information is received while the output device continues to display an application image.

20. An information processing system comprising:
circuitry configured to execute a game application and generate image data for the game application to be displayed;
memory configured to store the image data;
a communication interface configured to receive operation information corresponding to a user input received at an electronic device, wherein
the circuitry is configured to perform control to store the image data for the game application for a predetermined period of time up to a point in time at which the operation information is received from the electronic device.

* * * * *